F. O'NEILL, Jr.
FIBROUS PLANT DECORTICATING MACHINE.
APPLICATION FILED MAY 16, 1916. RENEWED NOV. 29, 1920.
1,371,805.
Patented Mar. 15, 1921.
5 SHEETS—SHEET 1.
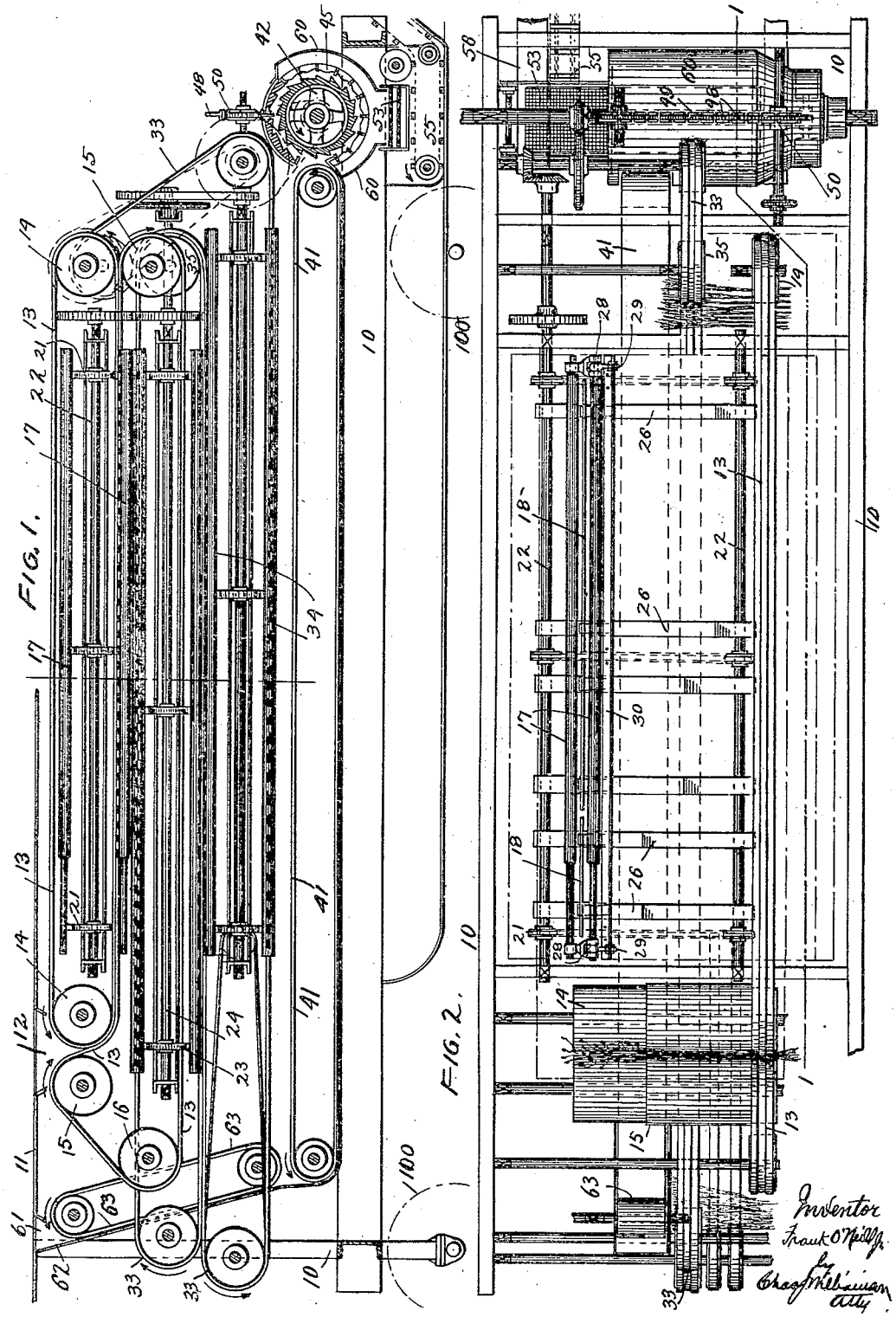

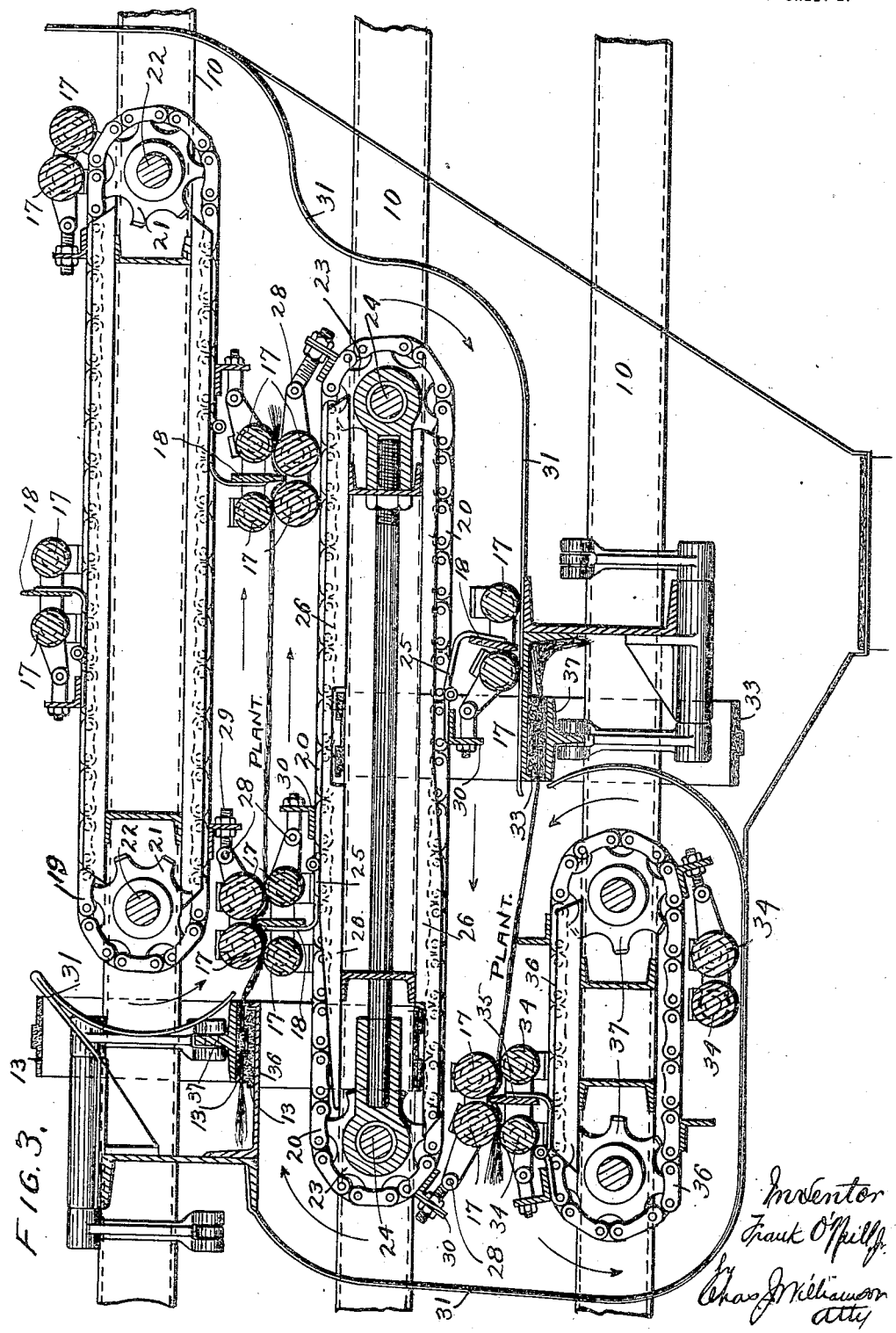

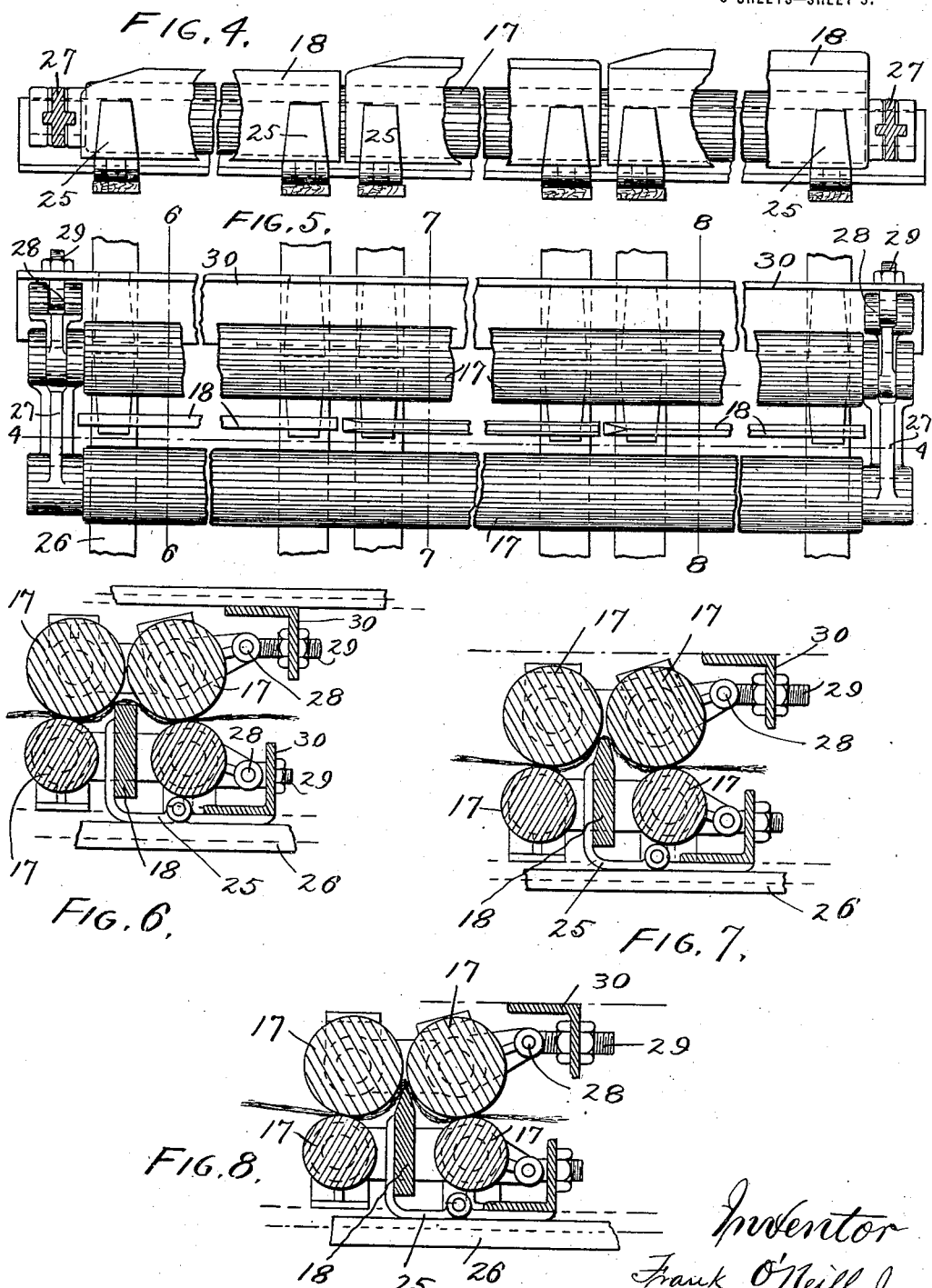

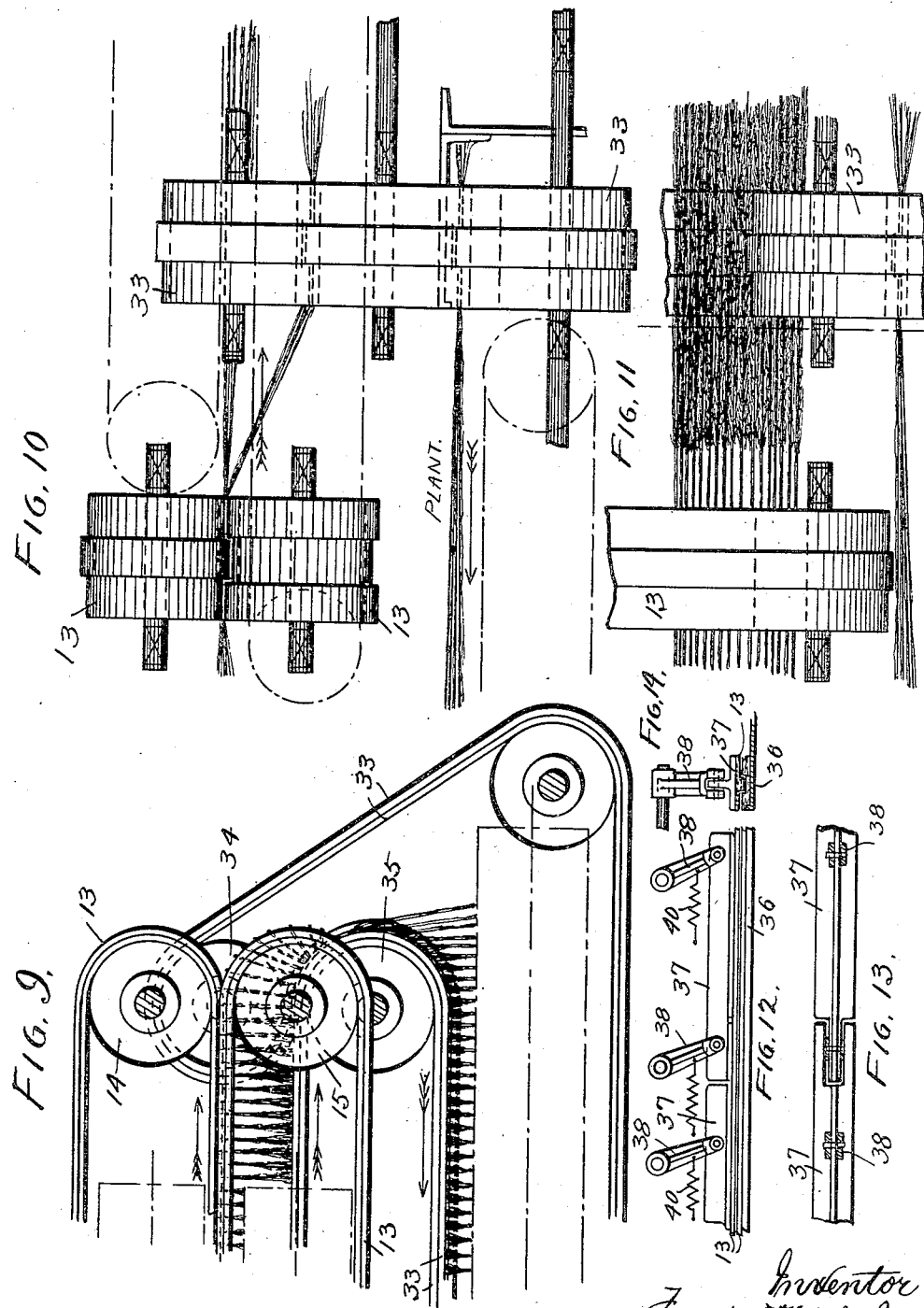

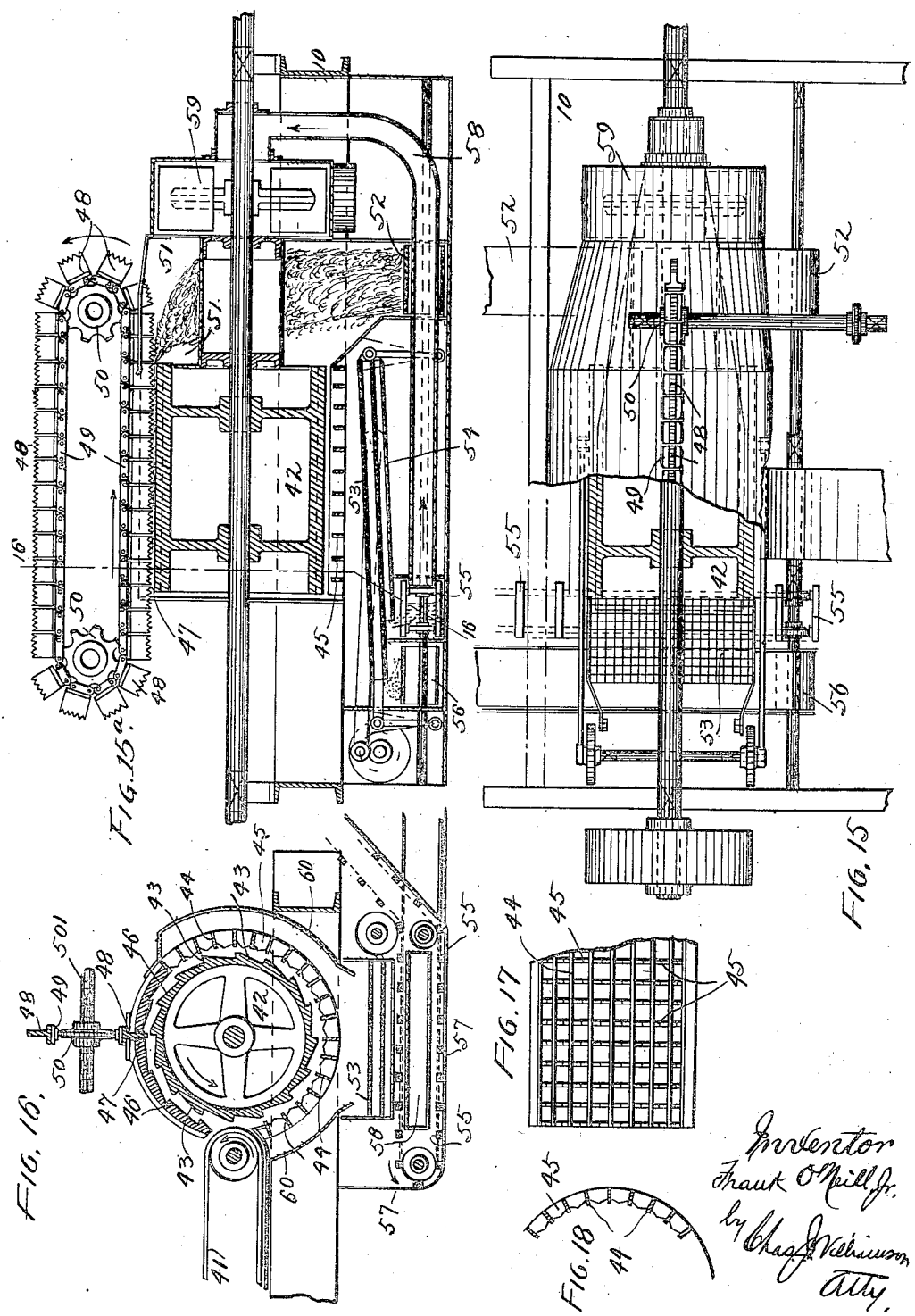

UNITED STATES PATENT OFFICE.

FRANK O'NEILL, JR., OF PHILADELPHIA, PENNSYLVANIA.

FIBROUS-PLANT-DECORTICATING MACHINE.

1,371,805.   Specification of Letters Patent.   Patented Mar. 15, 1921.

Application filed May 16, 1916, Serial No. 97,972. Renewed November 29, 1920. Serial No. 427,210.

*To all whom it may concern:*

Be it known that I, FRANK O'NEILL, Jr., a citizen of the United States, and resident of Philadelphia, in the county of Philadelphia and in the State of Pennsylvania, have invented a certain new and useful Improvement in Fibrous-Plant-Decorticating Machines, and do hereby declare that the following is a full, clear, and exact description thereof.

My invention relates to the separation from plants of the fibers thereof. My invention may be embodied in machines to deal with plants of great variety, including, for example, manila, banana, flax, ramie, hemp, etc., and the object of my invention, generally stated, is to provide a machine and mode of treatment by which, with a minimum of waste, the fiber (and in the case of flax the seed thereof) may be separated from the plant, and in particular from the stalks in an unretted condition. I accomplish my object, as far as the safeguarding of the fiber is concerned, by avoiding that harsh, or violent treatment of the woody portion of the stalk, which is inevitable from such instrumentalities as corrugated rollers, reciprocating breakers, etc., and causing in place thereof a gentle, but nevertheless efficient action upon the woody material which will result in its being loosened from the fiber and broken so as readily to be separated therefrom without injury to the fiber.

In the machine shown in the accompanying drawings in which I embody my invention, it will be found that in its general respects the machine has the characteristics of the machine of my pending application No. 861,261, filed September 11, 1914, and the machine shown in the drawings is an embodiment of my invention for the decorticating and seeding of flax, and in which drawings—

Figure 1 is a side elevation, somewhat diagrammatic, of a flax decorticating machine embodying my invention;

Fig. 2 is a top plan view thereof with the feed table removed;

Fig. 3 is a vertical section of the decorticating portion of the machine on the line 3—3 of Fig. 1;

Fig. 4 is a detail view in side elevation with parts in section showing the plant flattening and bending device;

Fig. 5 is a plan view thereof;

Figs. 6, 7 and 8, are, respectively, sections on the lines 6—6; 7—7 and 8—8 of Fig. 5;

Fig. 9 is a detail view in side elevation of the mechanism for transferring the stalks after partial decortication from one conveyer to the other;

Fig. 10 is an end view thereof;

Fig. 11 a top view thereof;

Figs. 12 to 14 are detail views of a form of pressure-producing device for the plant conveyers;

Figs. 15 to 18 are detail views of the threshing screen mechanism at the discharge end of the machine.

The machine shown in the drawings is organized so that it has a frame 10 adapted to be mounted upon carrying wheels 100 so that the machine may be readily transported and used in the field. Said frame may be constructed of I-beams or channels and it supports a horizontal feed table 11 upon which the plants are placed and spread evenly and thin so that they may be readily passed into a hopper 12 and their root ends caught by a conveyer that consists of a pair of endless belts 13. One of the belts 13 passes over two pulleys or rollers 14, while the other belt 13 passes over two pulleys 15, each contiguous to one of the rollers 14 and over a third pulley, or roller 16, the rollers being arranged so that each belt has upper and lower long horizontal runs with the lower horizontal run of one belt adjacent the upper horizontal run of the other belt and it is between such adjacent horizontal runs that the root portion of the plants is gripped. The belts are ribbed or corrugated longitudinally so that the longitudinal rib on one belt projects into a groove in the opposite belt and thereby the clamped portion of the plant is caught or crimped between opposing ribs and grooves and thus is securely held against longitudinal displacement while being subjected to the action of the decorticating apparatus that exerts a longitudinal pull on the plants in the direction away from the belts.

There are two sets of decorticating devices, one of which acts upon the plants for a portion of the length thereof, while the root parts are held by the two belts 13 and the other set subsequently acts upon the portions of the plants inaccessible to the first set by reason of the engagement of the clamping belts therewith, and each of these sets comprises a plurality of opposing coacting flattening rolls and blades situated between a pair of rolls so that the plants in passing from one roll to another are carried over the edge of the blade in a gentle, easy motion that has the effect, due to the previous flattening of the stalk by the action of the rolls, of separating, or loosening the woody portion of the stalk from the fiber and breaking such woody portion in short lengths. These devices are moved lengthwise of the plants toward the free ends thereof, their action beginning first at or near the free ends and continuing progressively away therefrom toward the clamped or held portions of the plants. After the action of one set of flattening and bending devices the grip of the conveyer belts 13 is released from the root or end portions of the plants and the seed or other end portions of the plants (having been first denuded of the seed and decorticated) are clamped by the adjacent runs of similar belts.

Each set of flattening rolls and bending blades consists of two series of softening rollers 17 and blades 18, respectively, mounted upon endless chains or carriers 19 and 20, the chains 19 passing over proper wheels 21 on shafts 22 and the chains 20 passing over proper wheels 23 on shafts 24, so that there are horizontal runs of the chains 19 and 20 that are parallel and which bring the rollers 17 in opposing pairs.

The rollers 17 of each carrier chain 19 and 20, are themselves arranged in pairs, as may best be seen by reference to Figs. 3 to 8, and in the case of alternate pairs of rollers on the same carrier chain there is a blade 18 situated between the pair of rollers with its plant-engaging edge in a plane sufficiently above a plane tangential to the peripheries of the rollers on their outer side as to project into the spaces between an opposite pair of rollers on the other carrier so that, as illustrated in the figures of the drawings just referred, the plant passing between and engaged by the peripheries of rollers of opposing pairs will be carried in a sinuous course over the edges of the bending blades, which, as may best be seen by reference to Figs. 4 to 8, from the comparatively wide formation at the beginning of the bending action on the plant, are, by graduation at points successively along the blades in the travel of the plants where their working edges become narrower or thinner and project farther into the spaces between those rollers 17 having for themselves no associated blade, the result being that as clearly shown in Figs. 6 to 8 of the drawings, the plant bent first at an obtuse angle is more sharply bent in its progressive treatment so that by a gradual and not a violent process it is subjected to that bending after flattening which most efficiently breaks up and removes the woody portion of the stalk without injury to the line fiber. It will be seen from the alternating arrangement of the bending blades, the plant is subjected to a bending action, first in one direction and then in the opposite direction, so that the plant in its progress through the machine is subject to a succession of back and forth bendings. Each blade 18 is most conveniently made of a number of alining sections, as best shown in Figs. 4 and 5, and each section for its support is attached to one or more, preferably two, straps 25 that are pivoted, or hinged to the endless chain 19 or 20, as the case may be, a guide 26 in the form of a bar or rail adapted to engage the strap 25 being provided that acts to rock the blade into plant-engaging position and to maintain it in such position for the period of time desired. Each pair of rollers 17 is journaled at its opposite ends in a bearing bar 27 which has a pivotal connection at 28 to an adjusting bolt 29 attached to a cross bar 30 which is secured to the carrier chain 19 or 20, as the case may be. Guide plates 31, wherever necessary, are provided to engage and support the rollers 17 in making their turns from the upper to the lower horizontal runs and for supporting the rollers attached to the carrier chains 20 during that portion of their lower horizontal run, when they need such support as may best be seen by reference to Fig. 3 of the drawings.

After passing from between the adjacent runs of the chains 19 and 20, the free ends of the fiber completely decorticated are caught and clamped between adjacent runs of two belts 33 corresponding to the two belts 13, and the as yet undecorticated portions of the plant are presented thereby to the action of the flattening rollers 17 and bending blades 18 on the lower run of the chains 20 and similar flattening rollers 34 and blades 35 on endless chains 36 which are supported by wheels 37 on endless chains 38. It will thus be seen that I make the chain 20 and the rollers and blades thereof coöperate with each of two similar mechanisms and thus provide a simplified and compact structure.

The fiber completely decorticated and having the seed completely removed (if the plants dealt with carry seed) is delivered as line fiber from between the belts 33 to a suitable receptacle.

The manner of transfer of the plants from the carrier belts 13 to the carrier belts 33 is best illustrated in Figs. 2, 9, 10 and 11, from which it will be seen that at the point where the plants are to be released from the belts 13 the belts 33 are arranged at the side thereof being for this purpose carried successively over contiguous rollers, or pulleys 34 and 35, which constitutes the receiving end of the carrier belts 33, so that before the plants are released from one pair of belts they are caught by the other pair of belts leaving the previously held or clamped portions thereof free and in a condition for the decorticating action thereon. The belts are ribbed or corrugated longitudinally so that the longitudinal rib on one belt projects into a groove in the opposite belt and thereby the clamped portion of the plant is caught or crimped between opposing ribs and grooves and thus is securely held against longitudinal displacement while being subjected to the action of the decorticating apparatus that exerts a longitudinal pull on the plants in the direction away from the belts. The plant clamping adjacent portions of the belts are supported by a horizontal track 36 and they are yieldingly pressed toward each other while they clamp the plants by a series of spring-held presser devices in the form of a series of bars 37 placed in alinement with the ends of contiguous bars interlocking by a tongue and groove arrangement (see Fig. 13) so as to provide a practically contiguous or uninterrupted bearing surface against the uppermost run of the clamping runs of the two belts, so that pressure is not relaxed at any time on the plants. Each bar, or section 37 is pivotally suspended by parallel levers 38 that are each connected to one end of a spring 40 whose other end is attached to some relatively stationary point so that its tension may be adjusted. The levers 38 incline slightly forward in the direction of travel of the clamp portions of the belts so as to avoid any danger of jamming or clogging.

The seed, short fiber and shive coming from the decorticating mechanism are received by a belt conveyer 41 and delivered to a combined separator tow softening and decorticating mechanism appearing in Fig. 1 and illustrated in detail in Figs. 14 to 18. Said mechanism comprises a cylinder 42 having on its periphery ratchet tooth shaped longitudinally extending ribs 43, and a cooperating cylindrical shell, or casing within which said cylinder 42 revolves, the inner periphery of said shell, or casing being provided with ridges, or teeth, which, from the point where the stuff to be acted upon enters the shell around to the opposite side is composed of a series of parallel spaced bars 44 that extend parallel with the cylinder axis, and a series of spaced parallel arc-shaped bars 45 whose inner edges are toothed, or serrated, the spaces thus provided being for the purpose of allowing the discharge from the casing of seed and woody matter, or shives, while permitting the retention within the casing, and upon the periphery of the drum 42 of the tow, so that the latter by being carried by the drum over the asperities, or rough surfaces of the shell, or casing, will be softened. The upper, or remaining portion of the drum, or casing is solid, but with its inner curved surface toothed, or provided with ratchet tooth shaped ribs 46 for coaction with the corresponding formation of the drum or cylinder 42. In the top of said shell, or casing, there is a slot 47, which extends parallel with the axis of the drum 42, and throughout the length of the casing for the entrance and passage of an endless series of blades 48 attached to an endless belt or chain 49 which passes over suitably supported wheels 50 on shafts 501 to one of which power is transmitted to move the endless series of blades, the outer edges of said blades being toothed, or serrated, as shown, so as to catch any tow upon the periphery of the drum 42 and to move the same longitudinally of the drum and finally deliver it therefrom into a chamber 51 at one end thereof in the bottom of which is an endless conveyer, or apron 52 by which it may be removed to a suitable point of discharge. By varying the ratio of speed of movement of these blades 48 and revolution of the drum 42, it will be seen that the retention of the tow for the softening action of the drum 42, and its coacting inclosing shell may be had for any period that may be found necessary to produce the required softening effect.

The seed and shive and other undesirable matter passing through the slatted shell, or casing of the drum 42, are delivered to a shaking screen 53 of ordinary construction not needed to be described in detail, from which the seeds are delivered to a delivery plate 54, and thence to a skeleton endless conveyer 55, while the tailings or chaff is delivered to an endless conveyer or apron 56. The skeleton conveyer 55 is located in a casing, or trough 57 into the side of which opens the intake end of an air pipe or trunk 58, which thence leads to a suction device, or blower 59 by which any dust, or light chaff carried along with the seed may be removed therefrom so that the seed will finally be delivered from the machine in a clean state.

Around the slatted portion of the shell, or casing within which revolves the drum 42, are curved guide walls 60 that lead to and terminate above the screen 53, so that thus a closed chamber is provided which prevents the escape of material except to the shaking screen.

The rollers 14 and 15 over which the conveyer belts 13 pass at the hopper are reduced in diameter at one end for a distance corresponding to the seed-carrying portions of the plant so that the seed in passing between said rollers will not be crushed or otherwise injured although being subjected to a slight squeezing pressure which breaks open or crushes the seed balls.

Just in advance of the hopper 12 the feed table has an opening 61 too small for the passage of plants of normal length and in a separated condition, which leads to a hopper 62 for receiving tangled straw or stock, which on being passed into said hopper is taken by an endless apron 63 and carried thereby to the conveyer 41 which delivers it to the separator and softened by which the separation of the fiber in the form of tow, and the seed and chaff are effected.

Only a brief description of the operation of the machine shown, is necessary. The plants are placed upon the feeding table and spread out, or scattered thin, and even, with the root end of the straw placed so that it will enter between the feed belts 13 with the seed ends passing between the reduced portions of the belt rollers 14 at the inlet end of the machine. The straw as it passes along with the belts 13 has the seed balls crushed by the action of the scutcher blades to which the seed portions of the straw are presented for the removal of the seed, in the most efficient manner by said blades. Continuing along with the belts 13, the straw is subjected to the flattening action of the rolls 17 and then to the bending and breaking action of the blades 18, the straw being progressively acted upon from the seed end to a given point beyond the longitudinal center of the straw. The limit of travel with the belts 13 being reached, the root portion of the straw passes from between said belts and simultaneously the decorticated opposite end of the straw is caught by the conveyer formed by the lower belts 33 which feed the partially decorticated straw in the opposite direction for the action of the other set of flattening and bending devices which operate upon the undecorticated portions of the straw working thereon progressively from the end to, or slightly beyond the point where the first decorticating mechanism completes its operation and from the second conveyer formed by the belts 33, line fiber is delivered while the remainder of the material, consisting of shives, seed and tow, passes to the softener separator for further treatment and final delivery from the machine in a separated condition. An important feature of my invention is the manipulation of the straw while passing through the decorticating mechanism by which it is drawn while under tension and alternately bent in opposite directions while in different planes, for thereby the treatment is highly efficient, but mild and free from danger in injuring the fiber. It will be seen that the flattening of the straw preliminary to bending and scraping it, as for example by the squeezing action of the feed rollers, results in placing the straw in a condition which avoids breaking of the line fiber and facilitates the subsequent removal of the woody portion of the straw. Thus the operation on the straw is first its flattening and then a sliding and crushing action that results in the gentle fracture of the woody portion of the straw without injury to the line fiber, and then its separation from the line fiber. Should the straw be abruptly bent in its round or unflattened state, injury to the line fiber and resulting tow is unavoidable.

As will be evident, changes in details of construction and organization of the various parts of the machine illustrated as embodying my invention may be made without departure from the spirit, or principle of my invention, and some elements or members may be altogether omitted, or used in other relations. It is, therefore, to be understood that the machine shown in the drawings is but one of many embodiments of my invention.

It is also to be clearly understood that any desirable form of flattening members may be used, such as flat bars inclined, half rounds, ovals, etc.; instead of the rolls 17 as herein described without departing from the spirit or principle of my invention.

Having thus described my invention what I claim is—

1. In a machine of the class described, the combination of a succession of oppositely facing plant-engaging edges, pressure-exerting means associated with such edges for bending the plants thereover, the plants being bent in one direction over one edge and in the opposite direction over a succeeding edge, and means to cause relative movement of the plants and edges in a direction longitudinally of the plants.

2. In a machine of the class described, the combination of a succession of oppositely facing plant-engaging edges, roller-form, pressure-exerting means associated with such edges for bending the plants thereover, the plants being bent in one direction over one edge and in the opposite direction over a succeeding edge, and means to cause relative movement of the plants and edges in a direction longitudinally of the plants.

3. In a machine of the class described, the combination of an element having an edge adapted to engage the plants and relative to which the latter move longitudinally, and means to cause the plants to bend over such edge, comprising oppositely diverging surfaces between which such edge is situated, and which are movable.

4. In a machine of the class described, the combination of an element having an edge adapted to engage the plants and relative to which the latter move longitudinally, and means to cause the plants to bend over such edge, comprising a pair of rotatable rollers between which said edge is situated.

5. In a machine of the class described, the combination of an element having an edge adapted to engage the plants and relative to which the latter move longitudinally, and means to cause the plants to bend over such edge, comprising oppositely diverging surfaces between which such edge is situated, and which are movable, and a plant engaging surface adjacent each of said diverging surfaces.

6. In a machine of the class described, the combination of an element having an edge adapted to engage the plants and relative to which the latter move longitudinally, and means to subject the plants to roller pressure action on both sides of said edge.

7. In a machine of the class described, the combination of two series of pairs of opposing traveling rollers, and blades between the rollers of a pair having a plant-engaging edge in a plane to one side of a plane tangential to adjacent peripheries of the pairs of rollers.

8. In a machine of the class described, the combination of two series of pairs of opposing traveling rollers, and blades between the rollers of a pair having a plant-engaging edge in a plane to one side of a plane tangential to adjacent peripheries of the pairs of rollers, alternating blades of the two series having such edges on opposite sides of said blade.

9. The method of decorticating plants, which consists in bringing the plants, while under longitudinal tension, and a succession of oppositely facing edges into contact, by relative movement of plants and edges longitudinally of the plants, and subjecting the plants to pressure opposite such edges, and causing them to deviate from a straight line by bending over such edges, first in one direction and then in the opposite direction.

10. In a machine of the class described, the combination of two successively acting plant holding means which, respectively, engage the plants at different portions of their length, and means acting on the plants while held by said plant-holding means, comprising two series of pairs of opposing traveling rollers and blades between the rollers of a pair having a plant-engaging edge in a plane to one side of a plane tangential to adjacent peripheries of the pairs of rollers.

11. In a machine of the class described, the combination of plant-holding means, two series of pairs of opposing traveling rollers, and blades between the rollers of a pair having a plant-engaging edge in a plane to one side of a plane tangential to adjacent peripheries of the pairs of rollers, each of said series of pairs of rollers being carried by an endless carrier, and successive blades being mounted upon opposite carriers.

12. In a machine of the class described, the combination of two successively acting plant holding means which, respectively engage the plants at different portions of their length, means acting on the plants while held by said plant-holding means, comprising two series of pairs of opposing traveling rollers and blades between the rollers of a pair having a plant-engaging edge in a plane to one side of a plane tangential to adjacent peripheries of the pairs of rollers, each of said series of pairs of rollers being carried by an endless carrier, and successive blades being mounted upon opposite carriers.

13. In a machine of the class described, the combination of traveling plant-holding means, decorticating means to which the plants are presented by said traveling holding means, a revolving cylinder and shell within which the cylinder is mounted receiving a product of said decorticating means, and the inner periphery of the shell and the outer periphery of the cylinder being spaced apart, and roughened plant-engaging surfaces in said space.

14. In a machine of the class described, the combination of traveling plant-holding means, decorticating means to which the plants are presented by said traveling holding-means, a revolving cylinder and shell within which the cylinder is mounted, and the inner periphery of the shell and the outer periphery of the cylinder being spaced apart, roughened plant-engaging surfaces in said space, the lower part of the shell being provided with discharge passages, or openings, and a screen below said shell.

15. In a machine of the class described, the combination of a revolving cylinder, and a shell inclosing the same with a space between them, roughened plant-engaging surfaces in said space, and a traveling blade passing through an opening in the shell and having its edge contiguous to the cylinder roughened.

16. In a machine of the class described, the combination of a revolving cylinder, and a shell inclosing the same with a space between them, roughened plant-engaging surfaces in said space, and endless series of traveling blades entering a slot in the shell and reaching contiguous to the periphery of the cylinder, the edges of the blades next to the cylinder being serrated.

17. In a machine of the class described, the combination of decorticating and softening mechanism, a screening device, a skeleton conveyer to receive the seed from said device and pneumatic means to remove matters falling through the openings of the skeleton conveyer.

18. In a machine of the class described, the combination of decorticating and softening mechanism, a screening device, and a skeleton conveyer to receive the seed from said device, and an exhaust flue within said skeleton conveyer to remove matters falling through the openings of the skeleton conveyer.

19. In a machine of the class described, the combination of a plant holding means, two series of opposed coöperating traveling flattening members, a series of decorticating blades having plant engaging edges of varying angles placed between said traveling flattening members, means for holding one end of the stalks of the material, drawing and simultaneously advancing longitudinally the free end of said stalks between said flattening members, and over and in contact with the plant engaging edges of said decorticating blades.

20. In a machine of the class described, the combination of a plant holding means, two series of opposed coöperating traveling flattening members, a series of decorticating blades having plant engaging edges of varying angles placed between said traveling flattening members, means for holding one end of the stalks of the material, drawing and simultaneously advancing longitudinally the free end of said stalks between said flattening members, and while under longtudinal tension over and in contact with the plant engaging edges of said decorticating blades, and alternately bending said stalks in opposite directions.

21. In a machine of the class described, the combination of a plant holding means, two series of opposed coöperating traveling flattening members, a series of decorticating blades having plant engaging edges of varying angles placed between said traveling flattening members, means for holding one end of the stalks of the material, drawing and simultaneously advancing longitudinally the free end of said stalks between said flattening members, and over and in contact with the plant engaging edges of said decorticating blades, while said material is under tension, alternately bending same in opposite directions, and means of gradually increasing the bending movement of same.

22. In a machine of the class described, the combination of a traveling plant holding means, and two series of opposed coöperating traveling decorticating mechanisms, consisting of a series of opposed coöperating flattening members, and a series of blades having plant engaging edges of varying angles coöperating with the opposed adjacent surfaces of said flattening members, and means for adjusting the relative position of the opposed flattening members independent of said plant engaging edges of said decorticating blades.

23. In a machine of the class described, the combination of a revolving cylinder, a shell inclosing a portion of same with a space between them, rough plant engaging surfaces in said space, said shell provided with a longitudinal slot in same, an endless series of traveling blades entering said slot and reaching contiguous to the periphery of the cylinder, and means for varying the speed of travel of said blades.

24. In a machine of the class described, the combination of a feeding conveyer, a revolving cylinder, a shell inclosing a portion of same, a series of spaced bars placed below and at the rear of said cylinder, the inside surface of the shell provided with roughened plant-engaging surfaces, said spaced bars provided with plant engaging edges placed in close proximity to the surface of the plant-engaging surfaces of the cylinder, means for feeding the material through an opening in the shell to the cylinder, and gradually advancing the material longitudinally in the periphery of the cylinder, and means for varying the length of time the material remains on the periphery of the cylinder.

In testimony that I claim the foregoing I have hereunto set my hand.

FRANK O'NEILL, Jr.